Nott & Kelley,
Water Wheel
Nº 8,759.  Patented Feb. 24, 1852.
Fig; 3.
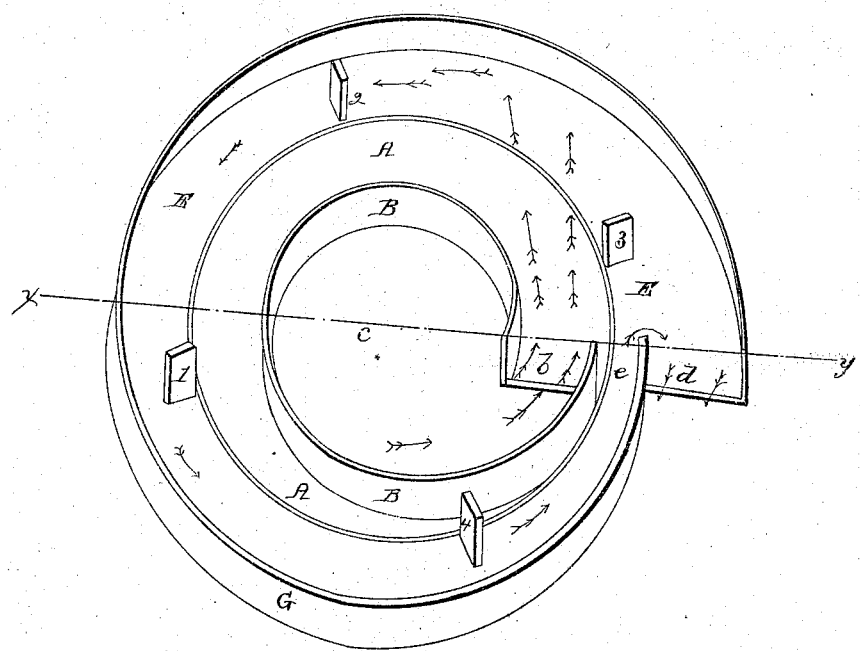
Fig; 5.
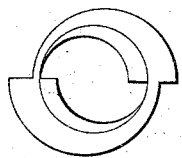
Fig; 6.
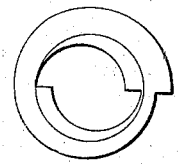
Fig; 4.
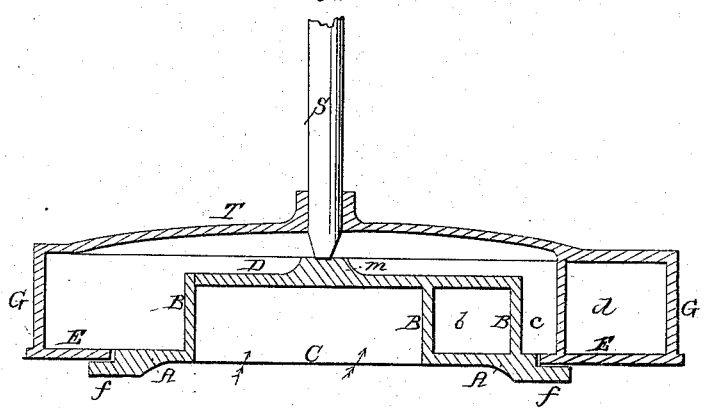
N. PETERS, PHOTO-LITHOGRAPHER, WASHINGTON, D. C.

UNITED STATES PATENT OFFICE.

JOEL B. NOTT, OF GUILDERLAND, AND WILLIAM S. KELLY, OF PRINCETON, NEW YORK.

IMPROVEMENT IN WATER-WHEELS.

Specification forming part of Letters Patent No. 8,759, dated February 24, 1852.

*To all whom it may concern:*

Be it known that we, JOEL B. NOTT, of Guilderland, Albany county, and WILLIAM S. KELLY, of Princeton, Schenectady county, State of New York, have invented a new and Improved Water-Wheel for the Propulsion of Machinery, which we call the "Helix Water-Wheel;" and we declare the following specification and drawings, forming part of the same, to be a full and complete description thereof.

In the accompanying drawings, Figure 3 shows a perspective view of the wheel and water-guide, the top covering of both being removed to show the form of the helical walls of both guide and wheel. Fig. 4 is a vertical section through Fig. 3 in the direction *x y,* and exhibits the mode by which the wheel is suspended, so as to revolve freely around the water-guide.

Similar letters denote the same parts of the apparatus.

A A is a circular disk having upon its upper surface a spiral-formed wall or partition B B, with the space at the terminations of the wall left open. The space inclosed by the walls of the bottom is cut away and left open for the ingress of water, and the top of the wall closed with a cover D. The disk A A has a flange *f f* projecting under and beyond its periphery, by which the machine is secured to the forebay or penstock supplying water to the wheel. This is the water-guide.

The vessel just described is surrounded and covered by the wheel whose bottom E E fits easily around A A, and is in the same plane with it. The outer wall or float G of the wheel is also helix-formed, with the spiral in the reverse direction of the walls of the guide and so arranged that the two walls may be a short distance apart at the nearest point of approximation *e,* the space *d* at the termination of the walls being left open for the exit of the water. The top T of this vessel passes just above and clear of the cover D of the inner vessel, and has passing through its top and keyed thereto a spindle or shaft S, which rests and turns upon a socket *m* on the cover D. By this spindle the upper vessel is suspended upon the lower one, so as to turn freely thereupon, and by proper gearing attached to it to transmit motion to any machinery. The water entering from the forebay by the opening C and pressing upward will pass out at the opening *b* and impinge against the wall G in the direction shown by the arrows in Fig. 3, driving the outer vessel around the inner one in the same direction, the water passing out from between the walls by the opening *d.*

The arrangement of the machine may be varied by the use of one or more spiral walls for either the inner or the outer vessel, or both, with openings for the ingress and egress of water between their lapping ends, as suggested by the sketches 5 and 6, all these being variations of the same design. Additional buckets, more or less in number, 1 2 3 4, may be placed along the inner circle of the wheel to assist the action of the currents of water upon it.

The form of the wheel may also be varied by substituting arcs of circles or sections of polygons in the place of scrolls or sections of the same.

We intend these wheels to be used in either a horizontal position, as shown in the drawings, or in a vertical position, at pleasure.

We do not claim a water-guide, as described in the foregoing specification, composed of a scroll or sections of scrolls or arcs of circles or sections of polygons, as concentric with the wheel to direct the action and impulse of the water upon the concentric wheel having its guiding-surface between parallel planes, as the scroll, and not spiral, as the screw; but What we do claim is—

A water-wheel composed of a scroll or section of scrolls or arcs of circles or sections of polygons, substantially as above described, in combination with a fixed internal guide or guides made in manner substantially similar to the float or floats of the wheel, but with the direction in reverse, there being sufficient space between the outer extremities of the guide or guides and the inner extremity of the float or floats to allow the water to pass between them in all positions, the space between them being substantially on the disk of the wheel, thus causing the driving-current of water to pass between the two in the direction of the wheel's motion and act directly upon the inner face of the wheel, propelling the wheel in the same direction with the current, the water being discharged, nevertheless, at the extremity of the scroll, helix, or arcs of circles, or sections of polygons, or either, of which the wheel may be composed, in a direction opposite to that in which the wheel revolves.

J. B. KNOTT.
WILLIAM S. KELLY.

Witnesses:
  ROBT. VARICK DE WITT,
  JOHN CASTIGAN.